United States Patent
de Jong et al.

(10) Patent No.: US 8,152,384 B2
(45) Date of Patent: Apr. 10, 2012

(54) PUSH-PULL FIBER OPTIC CONNECTORS AND METHODS FOR MAKING THE SAME

(75) Inventors: Michael de Jong, Colleyville, TX (US); Paul X. Devereaux, Dallas, TX (US); Ashley W. Jones, Denton, TX (US); Ronald L. Mudd, Coppell, TX (US)

(73) Assignee: Corning Cable Systems LLC, Hickory, NC (US)

( * ) Notice: Subject to any disclaimer, the term of this patent is extended or adjusted under 35 U.S.C. 154(b) by 98 days.

(21) Appl. No.: 12/579,598

(22) Filed: Oct. 15, 2009

(65) Prior Publication Data

US 2011/0091159 A1    Apr. 21, 2011

(51) Int. Cl.
G02B 6/36 (2006.01)

(52) U.S. Cl. ........... 385/53; 385/55; 385/56; 385/58; 385/59; 385/60; 385/65; 385/69; 385/70; 385/71; 385/72; 385/76; 385/77; 385/78; 385/80; 385/81

(58) Field of Classification Search ............. 385/53, 385/55–56, 58–60, 65, 69–72, 76–78, 80–81
See application file for complete search history.

(56) References Cited

U.S. PATENT DOCUMENTS

| | | | |
|---|---|---|---|
| 5,373,574 A | 12/1994 | Marazzi | 385/78 |
| 5,537,501 A | 7/1996 | Iwano et al. | 385/58 |
| 5,579,425 A | 11/1996 | Lampert et al. | 385/59 |
| 5,638,474 A | 6/1997 | Lampert et al. | 385/78 |
| 5,673,346 A | 9/1997 | Iwano et al. | 385/60 |
| 5,867,621 A * | 2/1999 | Luther et al. | 385/59 |
| 6,019,520 A | 2/2000 | Lin et al. | 385/76 |
| 6,019,521 A | 2/2000 | Manning et al. | 385/77 |
| 6,095,695 A | 8/2000 | Ohtsuka et al. | 385/72 |
| 6,224,268 B1 | 5/2001 | Manning et al. | 385/56 |
| 6,259,856 B1 | 7/2001 | Shahid | 385/147 |
| 6,276,839 B1 * | 8/2001 | De Marchi | 385/53 |
| 6,422,759 B1 | 7/2002 | Kevern | 385/60 |
| 6,443,627 B1 | 9/2002 | Anderson et al. | 385/56 |
| 6,450,695 B1 | 9/2002 | Matsumoto | 385/60 |
| 6,485,189 B1 | 11/2002 | Gilliland et al. | 385/59 |
| 6,554,487 B2 | 4/2003 | Nolan | 385/78 |
| 6,565,262 B2 | 5/2003 | Childers et al. | 385/76 |
| 6,641,310 B2 | 11/2003 | Williams | 385/92 |
| 6,650,806 B2 | 11/2003 | Rodgers et al. | 385/18 |
| 6,688,778 B1 | 2/2004 | Dixon | 385/72 |
| 6,764,225 B2 | 7/2004 | Ngo et al. | 385/87 |
| 6,848,838 B2 | 2/2005 | Doss et al. | 385/81 |
| 6,893,165 B2 | 5/2005 | Ngo | 385/87 |
| 6,899,468 B2 | 5/2005 | Ngo et al. | 385/87 |
| 7,003,208 B2 | 2/2006 | Yamaguchi et al. | 385/134 |

(Continued)

*Primary Examiner* — Brian M. Healy
*Assistant Examiner* — Guy Anderson
(74) *Attorney, Agent, or Firm* — Michael E. Carroll, Jr.

(57) ABSTRACT

Push-pull fiber optic connectors and cable assemblies having a latch that is actuated by a cam surface are disclosed. The fiber optic connectors include a ferrule and a housing having the latch. A shroud fits over a portion of the housing and allows the craft to grab the shroud and push the shroud and hence the fiber optic connector into a suitable adapter or the like. Likewise, the craft can grab the shroud and pull on the same to remove the fiber optic connector out of the adapter or the like. The cam surface is disposed on a decoupling member, wherein the decoupling member is attached to the shroud so the components can move together. Methods of making the push-pull fiber optic connector are also disclosed.

19 Claims, 3 Drawing Sheets

U.S. PATENT DOCUMENTS

| | | | |
|---|---|---|---|
| 7,008,117 B2 | 3/2006 | Kiani et al. | 385/58 |
| 7,052,186 B1 | 5/2006 | Bates | 385/59 |
| 7,063,554 B2 | 6/2006 | Kuiken et al. | 439/352 |
| 7,153,035 B2 | 12/2006 | Taira et al. | 385/76 |
| 7,182,522 B2 * | 2/2007 | Sasaki et al. | 385/53 |
| 7,210,861 B2 | 5/2007 | Nagasaka et al. | 385/88 |
| 7,261,470 B2 | 8/2007 | Miyao et al. | 385/70 |
| 7,331,718 B2 | 2/2008 | Yazaki et al. | 385/78 |
| 7,349,200 B2 * | 3/2008 | Hardt et al. | 361/679.55 |
| 7,377,699 B2 | 5/2008 | Terakura | 385/69 |
| 7,458,729 B2 | 12/2008 | Sasaki et al. | 385/55 |
| 7,465,106 B2 | 12/2008 | Ito et al. | 385/92 |
| 7,466,544 B2 | 12/2008 | Hardt et al. | 361/686 |
| 7,466,891 B2 | 12/2008 | Wagner et al. | 385/139 |
| 2004/0223699 A1 * | 11/2004 | Melton et al. | 385/53 |
| 2007/0211998 A1 | 9/2007 | Muhlegg et al. | 385/62 |
| 2008/0131055 A1 | 6/2008 | Parkman et al. | 385/58 |

* cited by examiner

PUSH-PULL FIBER OPTIC CONNECTORS AND METHODS FOR MAKING THE SAME

BACKGROUND

1. Field

The disclosure is directed to fiber optic connectors and methods for making the same. More specifically, the disclosure is directed to push-pull fiber optic connectors having a latch actuated by a cam surface.

2. Technical Background

Optical fiber is increasingly being used for a variety of applications, including but not limited to broadband voice, video, and data transmission. Benefits of optical fiber use include extremely wide bandwidth and low noise operation. With the increasing and varied use of optical fibers, it is important to provide efficient methods of interconnecting optical fibers. Fiber optic connectors have been developed for this purpose. It is important that fiber optic connectors not significantly attenuate or alter the transmitted signal. In addition, the fiber optic connector should be relatively rugged and adapted to be connected and disconnected a number of times in order to accommodate changes in the optical fiber transmission path.

Often times an array of optical fiber connectors are arranged in patch panels arranged in equipment racks to allow one location for optical interconnections and rearrangement of the network (i.e., moves, adds, and changes to the optical network). Moreover, as bandwidth requirements increase the fiber optic connectors are being arranged in high packing densities within these patch panels and/or equipment racks. Consequently, as the density of fiber optic connectors in a given space increases the amount of space available to the craft for grabbing and manipulating the fiber optic connector is generally reduced. For instance, the fiber optic connectors are spaced so close together that the craft may have difficultly grabbing an individual fiber optic connector to disengage and remove the same from a fully populated patch panel. The craft may try to remove several adjacent fiber optic connectors to access the desired connector and disengage the latch, but this undesirable, time-consuming and could result in a making a misconnection when reassembling the optical network.

Thus, there is an unresolved a need for a fiber optic cable connector that is simple, reliable, easy to assemble, and which offers easy connection and disconnection for the craft in high-density installations.

SUMMARY

Embodiments of the disclosure are directed to push-pull fiber optic connectors and associated cable assemblies. The fiber optic connectors include a latch that is actuated by a cam surface. Additionally, the fiber optic connectors include a ferrule and the latch is disposed on the housing of the fiber optic connector. The fiber optic connectors are advantageous since the craft can merely push or pull with sufficient force to insert or remove the fiber optic connector. This is especially useful when the fiber optic connector is used in high-density applications. Specifically, a shroud fits over a portion of the housing and allows the craft to grab the shroud and push the shroud and hence the fiber optic connector into a suitable adapter or the like. Likewise, the craft can grab the shroud and pull on the same to remove the fiber optic connector out of the adapter or the like. The cam surface is disposed on a decoupling member, wherein the decoupling member is attached to the shroud so the components can move together or the structure is formed as a single, monolithic part. Methods of making the push-pull fiber optic connector are also disclosed.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION OF THE PREFERRED EMBODIMENTS

Reference will now be made in detail to the preferred embodiments of the disclosure, examples of which are illustrated in the accompanying drawings. Whenever possible, like reference numbers will be used to refer to like components or parts.

The embodiments described herein include push-pull fiber optic connectors and cable assemblies and methods for making a fiber optic connector. As used herein, push-pull fiber optic connectors may be respectively connected or disconnected by pushing or pulling on the fiber optic connector. The concepts of the disclosure advantageously allow the craft to connect and disconnect the fiber optic connector easily and quickly in high-density installations. Reference will now be made in detail to the preferred embodiments, examples of which are illustrated in the accompanying drawings. Whenever possible, like reference numbers will be used to refer to like components or parts.

Figure 1:
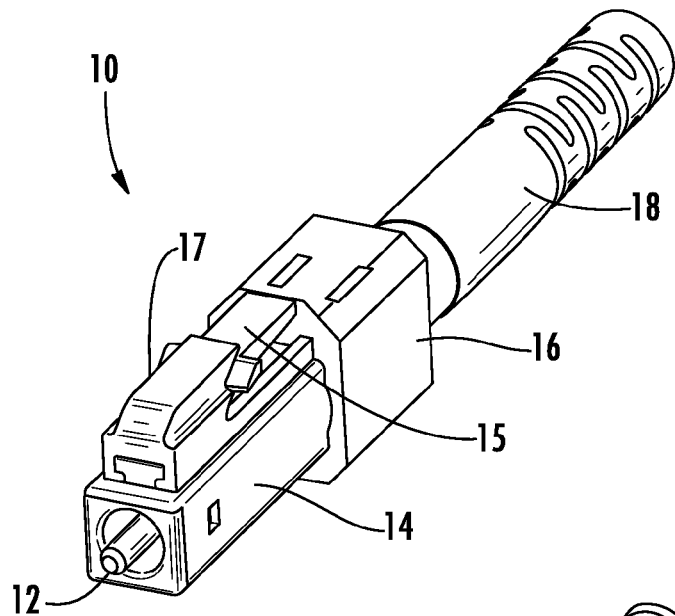
FIG. 1 is a perspective view of an assembled push-pull fiber optic connector as a portion of a fiber optic cable assembly.

FIG. 1 illustrates a perspective view of an assembled push-pull fiber optic connector 10. Fiber optic connector 10 includes a ferrule 12, a housing 14 having a latch 15, a shroud 16, a decoupling member 17, and a boot 18. Decoupling member 17 has a cam surface for moving the latch 15 of housing 14. Decoupling member 17 is attached to shroud 16 and both parts can move relative to housing 14. As used herein, cam surface means a surface that is used for moving the latch 15. The decoupling member 17 and housing 14 have cooperating geometry such as interlocking geometry, thereby allowing the decoupling member linear translation relative to housing 14. Although, illustrated as an LC connector the concepts disclosed are applicable to other suitable latching push-pull fiber optic connectors such as MTRJ and FJ.

Figure 2:
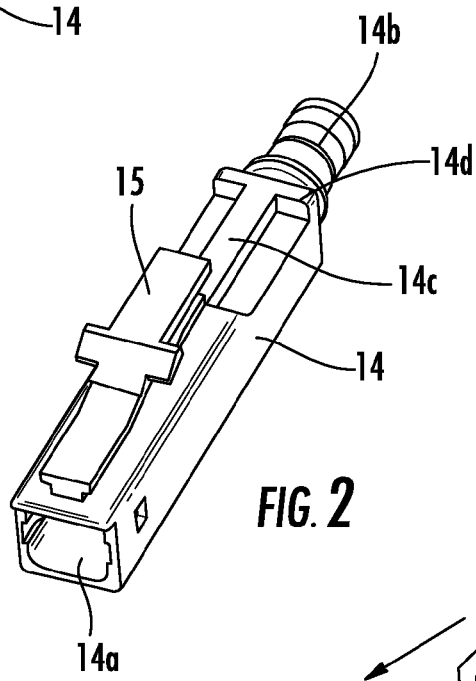
FIG. 2 is a perspective view of the housing of FIG. 1 depicting its latch and sliding geometry.

FIG. 2 is a top perspective view of the housing 14 showing the details of latch 15 and sliding geometry that cooperates with decoupling member 17. In this embodiment, housing 14 includes a front opening 14a, a crimp portion 14b at the rear, a sliding geometry 14c, and a stop 14d. Front opening 14a leads to a passageway that extends from the front end to the rear end and houses portions of other components such as the ferrule 12, a ferrule holder that may have a keying feature for keying to housing 14 as shown (FIG. 4), a spring (not shown), or the like. In this embodiment, the spring and ferrule holder assembly can be inserted into the passageway from front opening 14a and secured using a retention member (not numbered). Crimp portion 14b allows strain relieving of strength members of a fiber optic cable 30 using a suitable method such as a crimp band (not visible) or the like. Sliding geometry 14c cooperates with suitable geometry on decoupling member 17 to permit movement between the components. In one embodiment, the sliding geometry 14c of the decoupling member 17 and sliding geometry 14c on housing 14 can have an interlocking profile to aid in retention and linear translation. Housing 14 also includes a stop 14d to inhibit shroud 16 from over traveling. Other variations of the housing using the concepts disclosed are possible. Although latch 15 is depicted as a cantilevered latch, other suitable structure may be used for the resilient latch.

Figure 3:
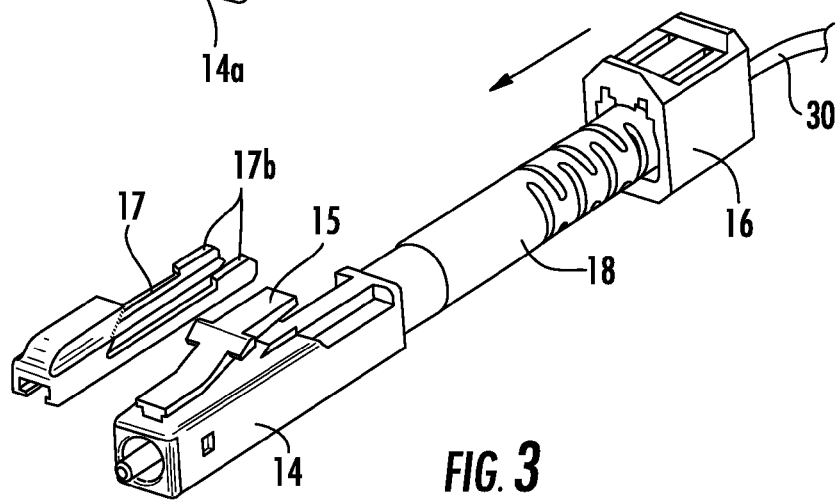
FIG. 3 is a perspective view of the partially assembled push-pull fiber optic connector of FIG. 1 showing a shroud being attached to a decoupling member.

FIG. 3 is a perspective view of the partially assembled fiber optic connector 10 before the shroud 16 is attached to decoupling member 17. As shown, shroud 16 is threaded onto fiber optic cable 30 and slid forward after boot 18 is attached as represented by the arrow. In this embodiment, decoupling member 17 includes two arms (not numbered) that extend rearward and having interlocking features such as a T-slot for cooperating with sliding geometry 14c on housing 14 such as a T-profile. Interlocking features allow linear translation of the decoupling member 17 along the longitudinal axis of housing 14, but inhibits unintended separation between the components.

Decoupling member 17 includes one or more retaining features 17b disposed on the rearward end of the arms for attaching decoupling member 17 to shroud 16. To attach decoupling member 17 the arms and the T-slot are aligned over the T-profile on the front end of housing 14 and slid thereon to the rear toward shroud 16. Retaining features 17b are aligned pushed into the cooperating structure on shroud 16 and preferably have a snap-fit therebetween.

Figure 4:
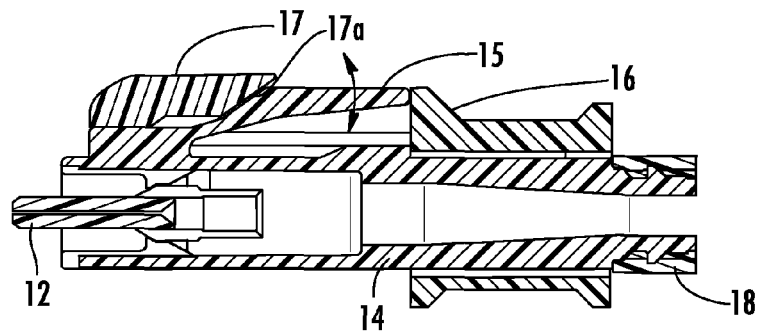
FIG. 4 is a cross-sectional view of the push-pull fiber optic connector of FIG. 1 showing a cam surface of the decoupling member in a first position.
Figure 5:
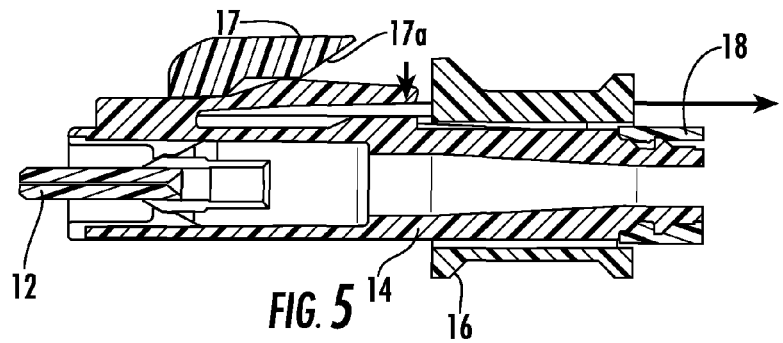
FIG. 5 is a cross-sectional view of the push-pull fiber optic connector of FIG. 1 showing a cam surface of the decoupling member in a second position.

FIGS. 4 and 5 are cross-sectional views showing decoupling member 17 and shroud 16 in two different positions. Specifically, FIG. 4 shows fiber optic connector 10 with the shroud 16 and decoupling member 17 in the forward position. When pushing fiber optic connector 10 into an adapter or the like to make the optical connection the craft grabs and pushes the shroud 16 and hence decoupling member 17 into the forward position. In the forward position, the latch 15 of housing 14 is free to move though its entire range as represented by the arrows. In other words, latch 15 can move without hitting a cam surface 17a of decoupling member 17. Consequently, as fiber optic connector 10 is pushed into the adapter or the like, the latch is pushed downward to and then springs upward to engage complimentary geometry on the adapter or the like for securing the same.

FIG. 5 shows fiber optic connector 10 with the shroud 16 and decoupling member 17 in the rearward position. When pulling fiber optic connector 10 out of the adapter or the like to disconnect the optical connection the craft grabs shroud 16 and pulls the shroud 16, and hence the decoupling member 17 rearward. In the rearward position, the latch 15 of housing 14 is pushed downward as shown, thereby releasing the latch 15 from the adapter or the like. In other words, latch 15 is pushed down by cam surface 17a contacting the same and pushing it down to release the catch between the latch 15 and the complimentary adapter or the like.

Figure 6:
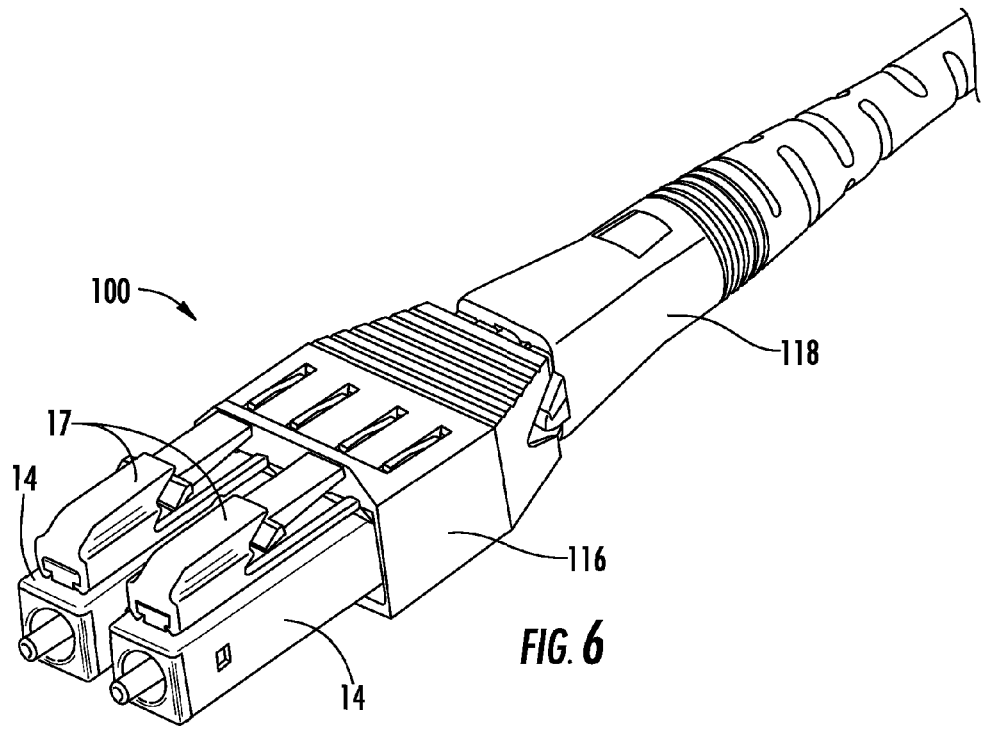
FIG. 6 is a perspective view of a duplex push-pull fiber optic connector as a portion of a single cable fiber optic cable assembly.

The concepts disclosed may be used with other suitable fiber optic connectors. For instance, FIG. 6 is a perspective view of a duplex push-pull fiber optic connector 100 that forms a portion of a cable assembly having a single fiber optic cable. In this embodiment, the shroud 116 fits over a plurality of fiber optic connector housings 14 and attaches to a plurality of decoupling members 17 in a similar manner to shroud 16. Simply stated, two housings 14 are attached to shroud 116 with a suitable spacing. Additionally, fiber optic connector 100 also includes a single boot for both optical fibers.

Figure 7:
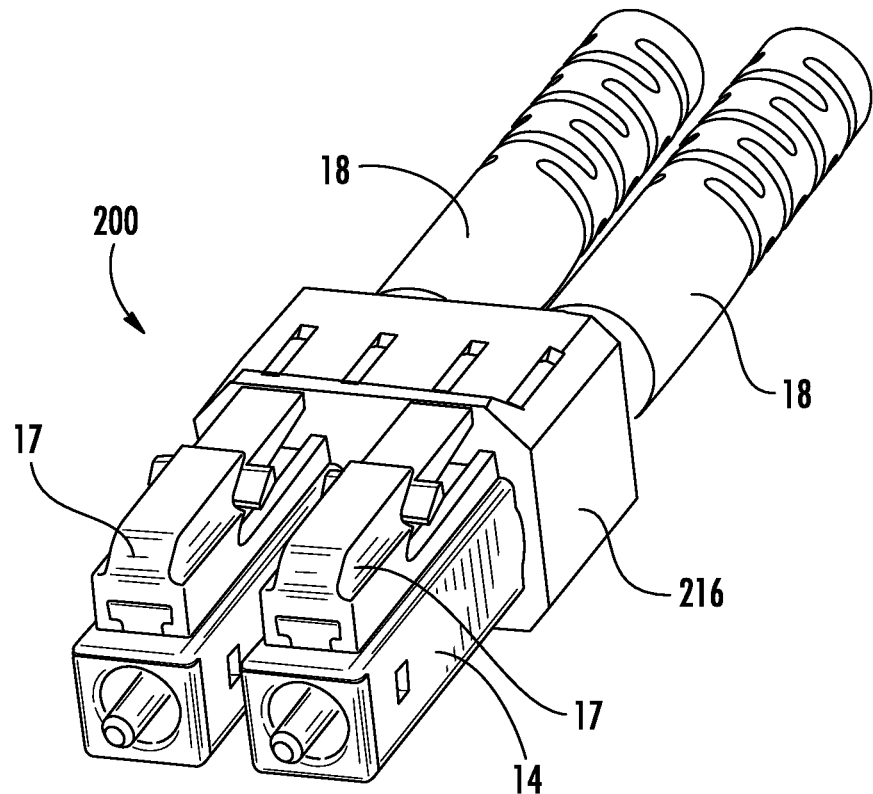
FIG. 7 is a perspective view of another duplex push-pull fiber optic connector as a portion of a dual fiber optic cable assembly.

FIG. 7 is a perspective view of another duplex push-pull fiber optic connector 200. In this embodiment, a shroud 216 fits over two fiber optic connector housing 14 like in fiber optic connector 100. Like the other embodiments, the decoupling members 17 attach to the shroud as discussed. However, fiber optic connector 200 has two individual boots 18 and two fiber optic cables (not shown) to form the duplex fiber optic cable assembly. Still other variations of fiber optic connectors are possible according to the concepts disclosed herein.

Figure 8:
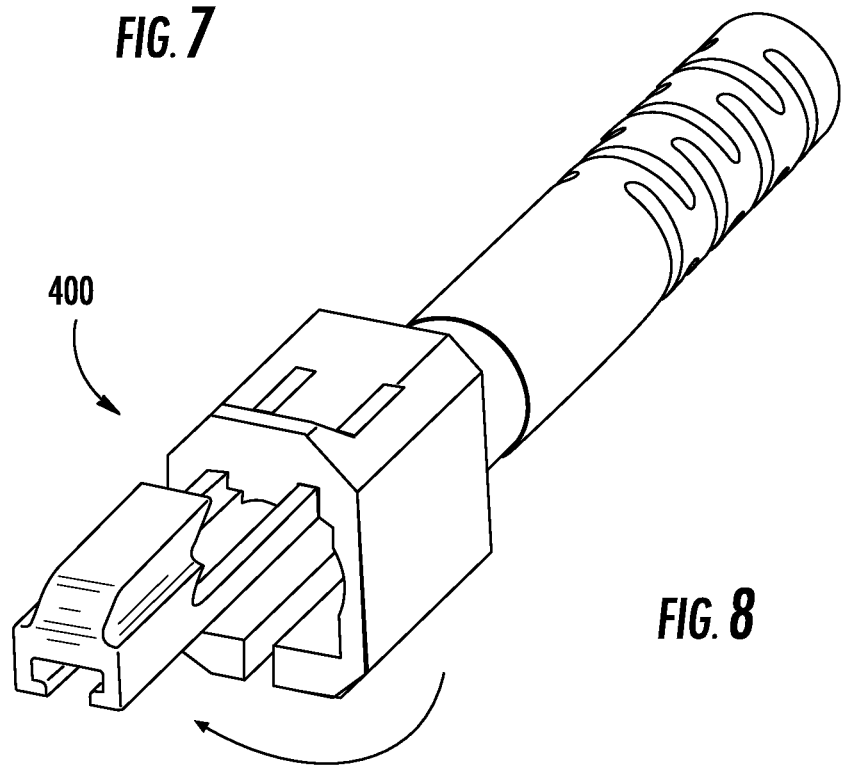
FIG. 8 is a perspective view of another decoupling member that is integrated with a shroud.

By way of example, FIG. 8 is a perspective view of another decoupling member 400 that has an integrated shroud forming a monolithic structure. In this embodiment, the shroud has a split at the bottom so that it can be flexed open and placed about the housing. Thereafter, the bottom portion of the shroud flexes closed as shown by the arrow for securing it to the housing. Other variations of fiber optic connectors include ferrules having a multi-fiber ferrule.

Although the disclosure has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the present invention without departing from the spirit and scope of the same. Thus, it is intended that the present invention cover the modifications and variations of this invention provided they come within the scope of the appended claims and their equivalents.

We claim:
1. A push-pull fiber optic connector, comprising:
a ferrule;
a housing having a cantilevered latch integrally formed with the housing;
a shroud that fits over a portion of the housing; and
a decoupling member having a cam surface for moving the cantilevered latch of the housing, wherein the decoupling member is attached to the shroud and the decoupling member and the housing have cooperating sliding geometry allowing the decoupling member and shroud to slide relative to the housing.

2. The fiber optic connector of claim 1, the decoupling member and the housing having interlocking geometry.

3. The fiber optic connector of claim 1, wherein the decoupling member has a retaining feature for attaching to the shroud.

4. The fiber optic connector of claim 1, wherein the shroud fits over a plurality of fiber optic connector housings.

5. The fiber optic connector of claim 4, wherein the fiber optic connector housings are LC housings.

6. The fiber optic connector of claim 1, further including a ferrule holder having at least one keying feature.

7. The fiber optic connector of claim 1, wherein the shroud and the decoupling member are a monolithic structure.

8. The fiber optic connector of claim 1, wherein the ferrule is a multi-fiber ferrule.

9. The fiber optic connector of claim 1, wherein the fiber optic connector is a portion of a fiber optic cable assembly.

10. A push-pull fiber optic connector, comprising:
   a ferrule;
   a housing having a cantilevered latch integrally formed with the housing;
   a shroud that fits over a portion of the housing; and
   a decoupling member having a cam surface for moving the cantilevered latch of the housing, wherein the decoupling member and the housing have cooperating sliding and interlocking geometry allowing the decoupling member and shroud to slide relative to the housing, wherein the decoupling member is attached to the shroud.

11. The fiber optic connector of claim 10, wherein the decoupling member has a retaining feature for attaching the shroud.

12. The fiber optic connector of claim 10, wherein the shroud fits over a plurality of fiber optic connector housings.

13. The fiber optic connector of claim 12, wherein the fiber optic connector housings are LC housings.

14. The fiber optic connector of claim 10, further including a ferrule holder having at least one keying feature.

15. The fiber optic connector of claim 10, wherein the ferrule is a multi-fiber ferrule.

16. The fiber optic connector of claim 10, wherein the fiber optic connector is a portion of a fiber optic cable assembly.

17. A method for making a push-pull fiber optic connector, comprising:
   providing a connector housing having a cantilevered latch integrally formed with the connector housing;
   attaching a decoupling member having a cam surface onto the connector housing; and
   providing a shroud that is attached to the decoupling member wherein the decoupling member and shroud can slide relative to the connector housing to move the cantilevered latch.

18. The method of claim 17, wherein the shroud fits over a plurality of connector housings.

19. The method of claim 17, attaching the fiber optic connector to a fiber optic cable.

* * * * *